United States Patent [19]
Jatcko

[11] 3,764,023
[45] Oct. 9, 1973

[54] SWING-AWAY AUTOMATION WORKPIECE GRIPPER

[76] Inventor: Joseph M. Jatcko, 15555 E. 12 Mile Rd., Bloomfield Hills, Mich. 48066

[22] Filed: May 3, 1972

[21] Appl. No.: 249,900

[52] U.S. Cl. .......................... 214/1 BC, 214/147 T
[51] Int. Cl. ............................................. B66c 1/42
[58] Field of Search ............... 214/1 BC, 1 BD, 1 B, 214/147 T

[56] References Cited
UNITED STATES PATENTS
3,400,836  9/1968  Bende............................. 214/1 BD OTHER PUBLICATIONS
Western Electric Technical Digest No. 3; July, 1966; pages 35 & 36

Primary Examiner—Robert G. Sheridan
Assistant Examiner—George F. Abraham
Attorney—Robert A. Sloman

[57] ABSTRACT

A swing-away automation workpiece gripper which, at rest, is in one position and when actuated, swings into a second angularly related position and successively engages a workpiece. Its power cylinder support is pivotally mounted on a vertical axis. Attached to the piston rod is a jaw assembly mount with a depending roller adapted to move along a cam slot for angularly positioning the complete assembly followed by an automatic jaw actuation.

6 Claims, 2 Drawing Figures

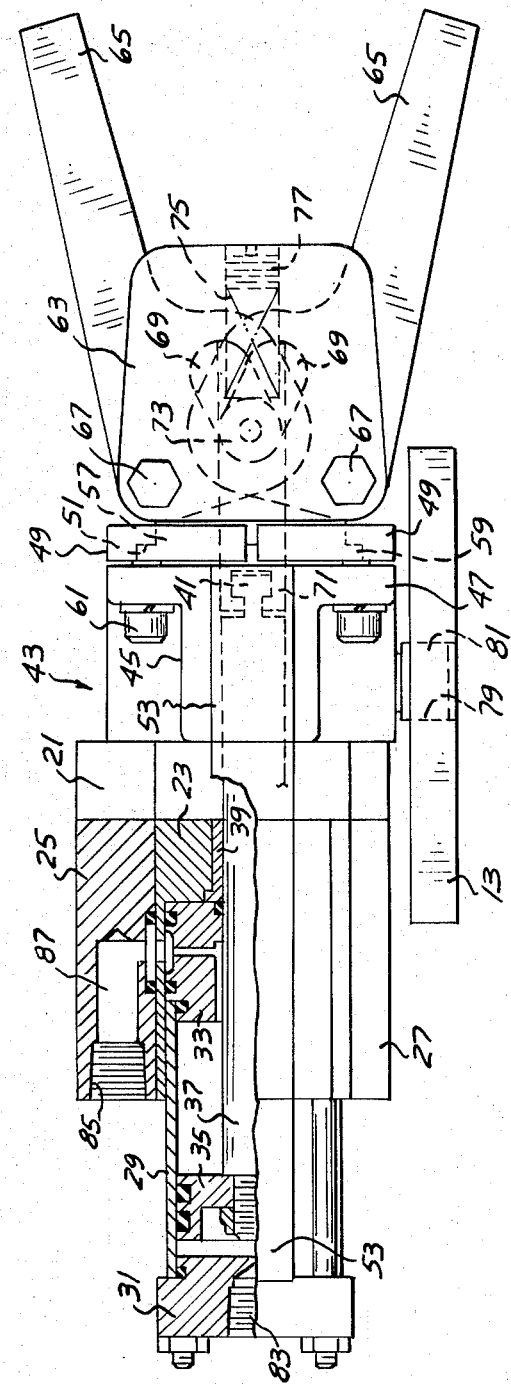

SWING-AWAY AUTOMATION WORKPIECE GRIPPER

BACKGROUND OF THE INVENTION

Heretofore, difficulties have existed in connection with stamping parts and in the provision of practical means for moving into the tool for inserting the part to be stamped and for successively removing the part in a continuing process.

Various efforts have been made in providing gripping arms which are adapted to normally move longitudinally ino the press or other machine tool for the purpose of depositing a part for a stamping operation for illustration. Temporarily withdrawing and thereafter returning to grasp the stamped part and for transporting the same to a second location.

BRIEF DESCRIPTION OF THE INVENTION

The present invention provides an improved swingaway automation workpiece gripper assembly wherein, normally a pair of said assemblies may be positioned upon opposite sides of a bed of a stamping tool for example and wherein, after the part has been stamped, the pair of automation workpiece grippers are actuated so as to swing from a normal at rest position aligned with the bed, to a position substantially at right angles thereto, so as to grip the workpiece for transporting the same out of the bed in the direction of the bed longitudinal axis, dropping the part and swinging away and returning to an initial position for a following similar operation.

It is the object of the present invention to provide an pneumatically operated jaw mount assembly which, not only automatically movably positions the gripper head from an at rest position to a secondary position at an angle thereto which may be a right angle and which automatically grips the workpiece and which is capable of transporting the workpiece to a secondary position away from the bed of the press or other machine tool.

It is another object to provide in conjunction with the support which is normally longitudinally movable of a pivotal mounting for the power operated jaw which functions in conjunction with a cam and slot relationship, by which on activation, the complete assembly is rotated from a rest position to a secondary position in registry with a workpiece and which automatically grips the workpiece.

These and other objects will be seen from the following specification and claims in conjunction with the appended drawings in which:

FIG. 2 is a fragmentary partly broken away section taken in the direction of arrows 2—2 of FIG. 1.

DETAILED DESCRIPTION

Figure 1:
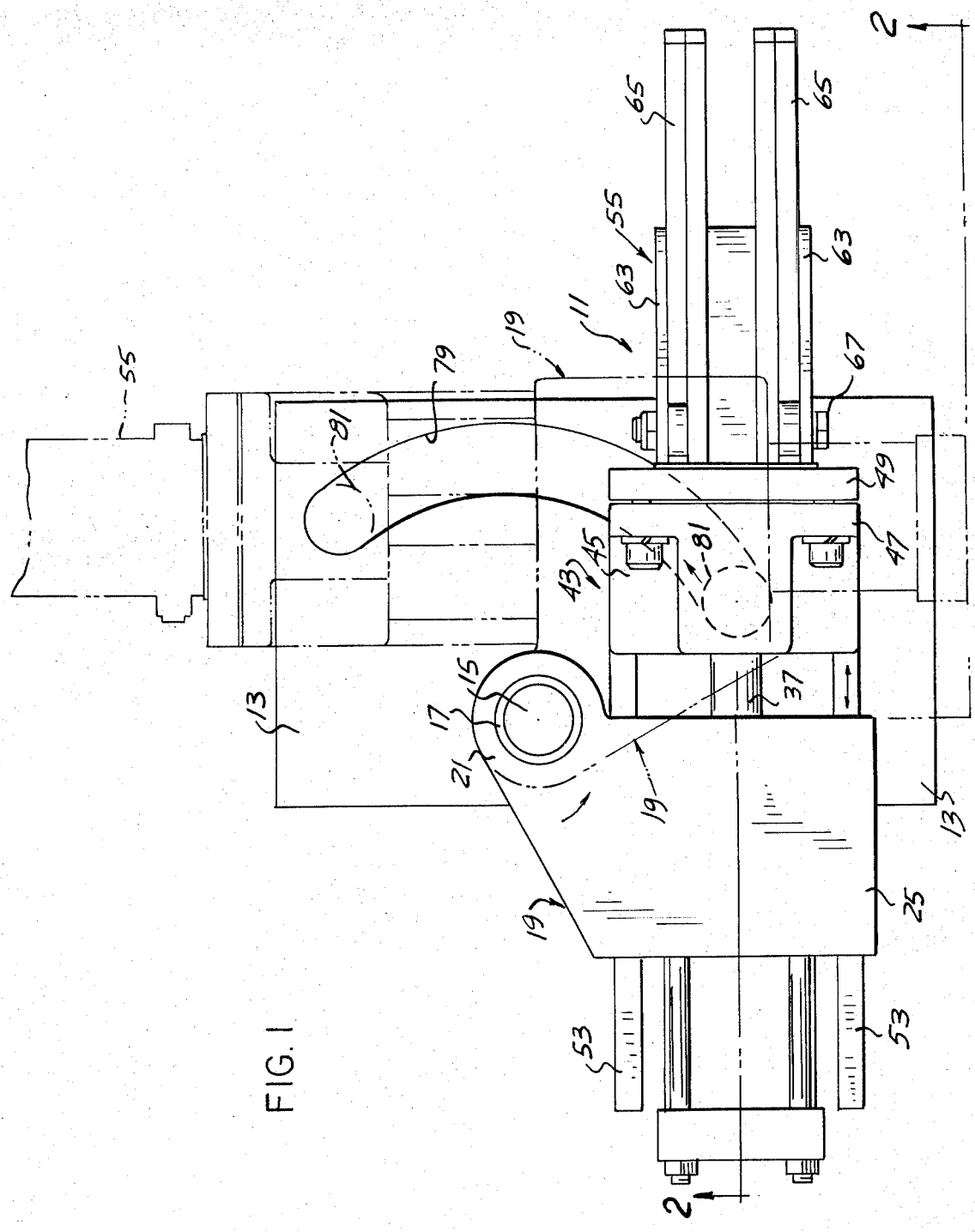
FIG. 1 is a plan view of the present swing-away automation jaw assembly with its secondary position shown in dotted lines.

The above drawing illustrates merely a preferred embodiment of the invention. Other embodiments are contemplated within the scope of the claims hereafter set forth.

REFERRING TO THE DRAWING

The present swing-away gripper head generally indicated at 11, FIG. 1, is mounted upon a base support 13. As environment of the manner in which the present device is employed, there may be a pair of these base supports 13 movably positioned upon opposite sides of the bed of a stamping tool, for example, and adapted to move automatically along rails in a direction corresponding to the longitudinal axis of the assembly shown in FIG. 1.

Mounted upon each of the base supports 13 is the present swing-away automation assembly 11 which, when pneumatically actuated, due to the action of the one power cylinder assembly, causes a repositioning of all parts to the dotted line position shown in FIG. 1 and at the end of such repositioning, automatically actuates the respective jaws for gripping a workpiece from opposite sides of the bed. So gripped, other means are employed not disclosed herein by which the respective opposed oppositely arranged pairs of base supports 13 are moved longitudinally while the gripping assemblies are in the dotted line position shown in opposed relationship to, thus, move the workpiece gripped to a secondary position out of the press or bed of the machine tool. At this point, on pressurizing the same power cylinder assembly, the jaws open first automatically to drop the workpiece and, thereafter, as an automatic operation, the jaw assembly combination swings back to the solid line position shown in FIG. 1 and by the same above-described automatic means the two support plates 13 return to the initial position on opposite sides of the machine tool bed for a subsequent operation which may be in a continuous manner.

The following description is directed to one of the swing-away jaw assemblies mounted upon its base support 13, FIGS. 1 and 2.

Upright stud 15 is anchored upon base support 13. Cylinder support block 19 includes an upright knuckle or hinge member 21 which is pivotally mounted upon stud 15 with a suitable bushing 17 interposed adapted for movements about a vertical axis.

The swing block or body 19 includes a central block 23 with top and bottom plates 25, 27 secured thereto, FIG. 2, by suitable fasteners.

An elongated cylinder assembly including cylinder 29 having blind end head 31 at one end and rod end head 33 is projected into the support block 23 suitably secured and sealed therein.

Piston 35 has attached thereto piston rod 37 which extends axially through the assembly and through the bushing 39 in block 23 and outwardly thereof terminating in a T-connector 41, FIG. 2.

Said piston rod at its free end extends into the bore of the jaw mount 43 which includes a body 45 with apertured flange 47 to provide a swivel assembly mounting for the jaw assembly 55.

For this purpose, there are provided a pair of vertically spaced opposed swivel mounting plates 49, FIG. 2, having an undercut interior and annular slot 51 adapted to supportably receive rotatively and adjustably the annular flange 59 at one end of the jaw body 57.

Suitable fasteners 61 adjustably secure the plates 49 relative to the flange 47 for retaining the jaw assembly including its body 57 at any desired position throughout 360°.

A pair of guide bars 53 at one end are joined to the jaw mount body 45 and extend rearwardly thereof and guidably engage opposite sides of the cylinder support block 19–23 and are adapted for longitudinal movement relative thereto as noted in FIG. 1.

The jaw assembly includes a pair of opposed upright side plates 63 between which a pair of opposed jaws 65 are pivotally mounted at 67.

Each of the jaws 65 includes an enlargement at its inner end which is positioned between the side plates 63 and has its own elongated control slot 69 which are angularly related with resect to the individual jaw for controlling pivotal movements thereof as required.

Reciprocal clevis 71 is axially aligned with the piston rod 37 and connected thereto by the cooperating T-slot and piston rod T-connector 41 as shown in FIG. 2 for movement in unison.

The clevis 71 is normally spring biased to the inoperative position shown by the compression spring 75 retained by the threaded stop 77.

The clevis or block 71 mounts on a transverse axis at least a pair of rollers 73 which are adapted for movement within the respective angularly related control slots 69 of the respective jaws.

By this construction upon forward movement of the piston rod and a corresponding axial movement of the clevis or block 71 and relative to the jaw body 57, then the jaws 65 will be moved towards each other to operatively engage a workpiece and will have suitable gripping elements thereon, not shown, for this purpose.

In the present construction, however, the jaws will not function until the jaw body assembly is restrained against longitudinal movement in such a manner as to permit relative longitudinal movement of the block or clevis 71 under the control of the piston rod.

As shown in FIGS. 1 and 2, and formed within the base support 13 or formed upon a plate attached to said base support is a preformed elongated control slot or groove 79 which cooperatively receives the roller 81 which is joined to and depends from jaw assembly body 45.

It is contemplated as a part of the present invention that the roller could be supported upon the base 13 to project upwardly within a corresponding slot arranged in a plate upon the undersurface of the jaw body 45.

In either event, initial longitudinal movement of the piston 37 will cause movement of the jaw support body 45 and its roller 81 within and along and in the direction of the cam groove 79. It is noted that the cam groove is arranged generally so as to extend at a right angle or any other suitable angle with respect to the initial longitudinal axis of the cylinder and jaw assembly, FIG. 1.

Accordingly, the initial forward movement of the piston rod will cause the jaw mount body 45 to move along the cam groove in a pivotal manner with respect to the pivot stud mounting 15 for the cylinder assembly mounting block 19-23. This causes the entire assembly including the cylinder to rotate to the dotted line position shown.

Simultaneously, there has been such longitudinal movement of the piston rod as to cause a certain amount of longitudinal movement of the jaw assembly mount 45 with respect to a cylinder mounting swingable block 19 as can be noted from the dotted lines, FIG. 1.

When the roller 81 reaches the end of the slot 79, regardless of the shape of the slot, the jaw body assembly 45 is constrained against further longitudinal movement with the result that there is then a relative movement of the piston rod and attached aligned block 71 with respect to the jaw assembly body 57. This causes the rollers 73 to move with respect to the jaw control slots 69 causing the jaws to close upon a workpiece gripping the same.

It is noted from FIG. 2 that cylinder head 31 is provided with a port 83 adapted to receive pressure fluid for effecting the initial longitudinal movement of piston rod 37. For movement in the opposite direction, port 85 and associated passage 87 formed within the top plate 25 on block 23 provides fluid communication to the opposite end of said cylinder for retracting the piston and associated piston rod.

Should it be desired at any time to change the plane within which the jaws 65 operate and pivot, all that is needed is to loosen the fasteners 61 on the jaw mount body 45. The jaw assembly body 57 may then be rotated to the desired angle and the fasteners 61 resecured.

Since this is done without changing the axial relationship of the parts, the jaw assembly need not be completely removed from the jaw mount.

Having described my invention, reference should now be had to the following claims:

I claim:

1. In a swing-away automation jaw assembly;
a base support;
an upright pivot stud thereon;
a cylinder support block pivoted on said stud adapted for rotation about a vertical axis;
a feed and actuator cylinder assembly for a work piece gripper including a cylinder with reciprocal piston rod mounted on said support block, offset from said stud;
a jaw assembly guidably mounted upon said support block for reciprocal longitudinal movements relative thereto;
said piston rod projecting into said jaw assembly;
said jaw assembly including a body and pivotal jaws adapted to engage a work piece, and reciprocal control means connected to said piston rod adapted on movements thereof to control said jaws;
said base support and said jaw body comprising a pair of elements;
one of said elements having an elongated cam slot formed therein and extending in a direction at an angle to the normal axis of said cylinder;
the other of said elements mounting a guide roller nested in and movable with respect to said slot;
whereby on initial movement of said piston rod said roller is moved relatively along said slot to the end thereof causing a controlled swing movement of said cylinder assembly and jaw assembly;
said piston at the end of said movement adapted to actuate said jaws.

2. In the swing-away jaw assembly of claim 1, said cam slot being formed in said base support, said roller mounted on and depending from said jaw assembly.

3. In the swing-away jaw assembly of claim 1, said cam slot being on said jaw body, said roller mounted on said base support.

4. In the swing-away jaw assembly of claim 1, the guide mounting of said jaw assembly including a pair of laterally spaced elongated guide bars secured to and extending rearwardly of said jaw body slidably mounted on said support block.

5. In the swing-away jaw assembly of claim 1, said reciprocal control means of said jaw assembly including a block guidably mounted on said jaw body, at one end removably and axially interlocked with said piston rod, the jaws having angularly related control slots therein; and rollers mounted on said block movably mounted in said slots for camming the jaws between open and closed position.

6. In the swing-away jaw assembly of claim 1, said jaw assembly including a mounting body having a bore receiving said piston rod, said jaw body including a rearwardly extending annular flange; and locking plates with undercut recesses therein mounted on said mounting body receiving said jaw body flange and adjustably secured thereto.

* * * * *